(12) United States Patent
Korosec

(10) Patent No.: US 7,433,826 B2
(45) Date of Patent: *Oct. 7, 2008

(54) SYSTEM AND METHOD FOR IDENTITY VALIDATION FOR A REGULATED TRANSACTION

(75) Inventor: Jason A. Korosec, Chesterland, OH (US)

(73) Assignee: Eleytheria, Ltd, Cleveland, OH (US)

( * ) Notice: Subject to any disclaimer, the term of this patent is extended or adjusted under 35 U.S.C. 154(b) by 739 days.

This patent is subject to a terminal disclaimer.

(21) Appl. No.: 10/242,150

(22) Filed: Sep. 12, 2002

(65) Prior Publication Data

US 2003/0056113 A1    Mar. 20, 2003

Related U.S. Application Data

(60) Provisional application No. 60/323,475, filed on Sep. 19, 2001.

(51) Int. Cl.
*G06Q 30/00* (2006.01)
*G07C 13/00* (2006.01)
*G06F 7/04* (2006.01)

(52) U.S. Cl. .............................. 705/1; 705/12; 340/5.8

(58) Field of Classification Search .................. 713/183
See application file for complete search history.

(56) References Cited

U.S. PATENT DOCUMENTS

| | | | |
|---|---|---|---|
| 5,577,120 A | 11/1996 | Penzias | |
| 5,677,521 A | 10/1997 | Garrou | |
| 6,040,783 A | 3/2000 | Houvener et al. | |
| 6,041,412 A | 3/2000 | Timson et al. | |
| 6,085,976 A | 7/2000 | Sehr | |
| 6,104,809 A | 8/2000 | Berson et al. | |
| 6,111,506 A | 8/2000 | Yap et al. | |
| 6,119,932 A | 9/2000 | Maloney et al. | |
| 6,137,895 A | 10/2000 | Al-Sheikh | |
| 6,149,056 A | 11/2000 | Stinson et al. | |
| 6,161,090 A | 12/2000 | Kanevsky et al. | |
| 6,178,510 B1 | 1/2001 | O'Connor et al. | ........... 713/201 |
| 6,182,221 B1 | 1/2001 | Hsu et al. | |

(Continued)

OTHER PUBLICATIONS

"DNA Fingerprinting in Human Health and Society"; David F. Betsch, Ph.D., Oct. 16, 2001, pp. 1-3 http://www.encyclopedia.com/articles/03711Applications.html, Last Viewed Oct. 16, 2001, p. 1-3.

(Continued)

*Primary Examiner*—Pramila Parthasarathy
(74) *Attorney, Agent, or Firm*—Amin, Turocy & Calvin, LLP

(57) ABSTRACT

A system and method for performing an identity validation is provided. The invention includes an identity transaction engine component and a communication component. The identity transaction engine component facilitates searching of data store(s) in order to validate identity related to a regulated transaction. The communication component facilitates communication between the identification validation system and remote system such as database(s) and/or data storage system(s). The data store(s) can store governmental agency and/or private entity information. The data store(s) can be remote or local. The invention further provides for the identification validation system to, optionally, include input device(s) and/or output device(s). The input device(s) facilitate identifying an entity to the identification validation system. The output device(s) facilitate communication to user(s) of the identification validation system.

17 Claims, 14 Drawing Sheets

U.S. PATENT DOCUMENTS

| | | |
|---|---|---|
| 6,335,688 B1 | 1/2002 | Sweatte |
| 6,357,010 B1 | 3/2002 | Viets et al. |
| 6,557,039 B1 | 4/2003 | Leong et al. |
| 6,580,356 B1 | 6/2003 | Alt et al. |
| 6,618,806 B1* | 9/2003 | Brown et al. ................ 713/186 |
| 2002/0046127 A1 | 4/2002 | Reding et al. |
| 2002/0067259 A1 | 6/2002 | Fufidio et al. |
| 2002/0091945 A1 | 7/2002 | Ross |
| 2002/0120477 A1 | 8/2002 | Jinnett |
| 2002/0128980 A1* | 9/2002 | Ludtke et al. ................ 705/67 |
| 2002/0194255 A1 | 12/2002 | Hellenthal |
| 2003/0005331 A1 | 1/2003 | Williams |
| 2003/0023874 A1 | 1/2003 | Prokupets et al. |
| 2003/0055689 A1 | 3/2003 | Block |
| 2003/0076935 A1 | 4/2003 | Gosney |
| 2004/0044627 A1* | 3/2004 | Russell et al. ................ 705/50 |

OTHER PUBLICATIONS http://www.encyclopedia.com/articles/03711Methods.html, Last Viewed Oct. 16, 2001, p. 1-3 http://www.encyclopedia.com/articles/03711.html, Last Viewed Oct. 16, 2001, p. 1-2.

International Search Report mailed Dec. 30, 2002 related to PCT/US02/29428 filed Sep. 17, 2002.

* cited by examiner

SYSTEM AND METHOD FOR IDENTITY VALIDATION FOR A REGULATED TRANSACTION

CROSS-REFERENCE TO RELATED APPLICATIONS

This application claims the benefit of U.S. Provisional Application Ser. No. 60/323,475 entitled SYSTEM AND METHOD FOR IDENTITY VALIDATION and filed on Sep. 19, 2001.

TECHNICAL FIELD

The present invention relates to the field of systems and methods for identity verification and/or validation for regulated transaction(s).

BACKGROUND OF THE INVENTION

Each day, thousands of regulated transactions (e.g., purchasing of alcohol and/or tobacco products, voting, driving in restricted area(s), renting vehicle(s), purchasing fire arm(s), requesting financial aid for college tuition and/or boarding of aircraft) occur. Generally, the ability to engage in a regulated transaction is based, at least in part, upon a person desiring to engage in the regulated transaction possessing certain attribute(s) (e.g., age, gender, registration status with Selective Service, history of conviction of felony and/or inclusion on list(s) of governmental agency and/or private groups). As demonstrated by the recent hijacking of commercial aircraft and the tragic consequences resulting therefrom, there is a need for systems and methods for identity verification and/or validation related to regulated transaction(s).

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention relates to a system and method for validating and/or verifying identity related to regulated transaction(s). According to an aspect of the present invention, an identification validation system includes an identity transaction engine component and an input component. The identity transaction engine component facilitates searching of data store(s) in order to validate identity (e.g., related to a regulated transaction). The input component facilitates identification of an entity seeking to engage in a regulated transaction.

Another aspect of the present invention provides for a regulated transaction authorization system to include an identity transaction component, a communications component and input device(s) and/or output device(s). The input device(s) facilitate identifying a person to the regulated transaction authorization system. The output device(s) facilitate communication to user(s) of the regulated transaction authorization system (e.g., results of the identification transaction engine component).

Yet another aspect of the present invention provides for the identification validation system to search data store(s) having information associated with identification. The data store(s) can store governmental agency and/or private entity information.

Another aspect of the present invention provides for attribute(s) of a regulated transaction to be obtained by the identity transaction engine component to determine, at least in part, data store(s) to be searched.

Another aspect of the present invention provides for information stored in the attribute store to act as static and/or dynamic rule(s) to be applied to regulated transaction(s) processed by the transaction engine component. Thus, rule(s) can be defined such that transaction(s) that are improbable or impossible are identified for further processing or review. Also, rule(s) can be applied to data flowing through the transaction engine component to mitigate authorization of undesired regulated transaction(s).

Yet other aspects of the present invention provides for methods for identification validation, a computer readable medium having computer executable instructions for identification validation and a data packet adapted to be transmitted between two or more computer processes related to identification validation.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
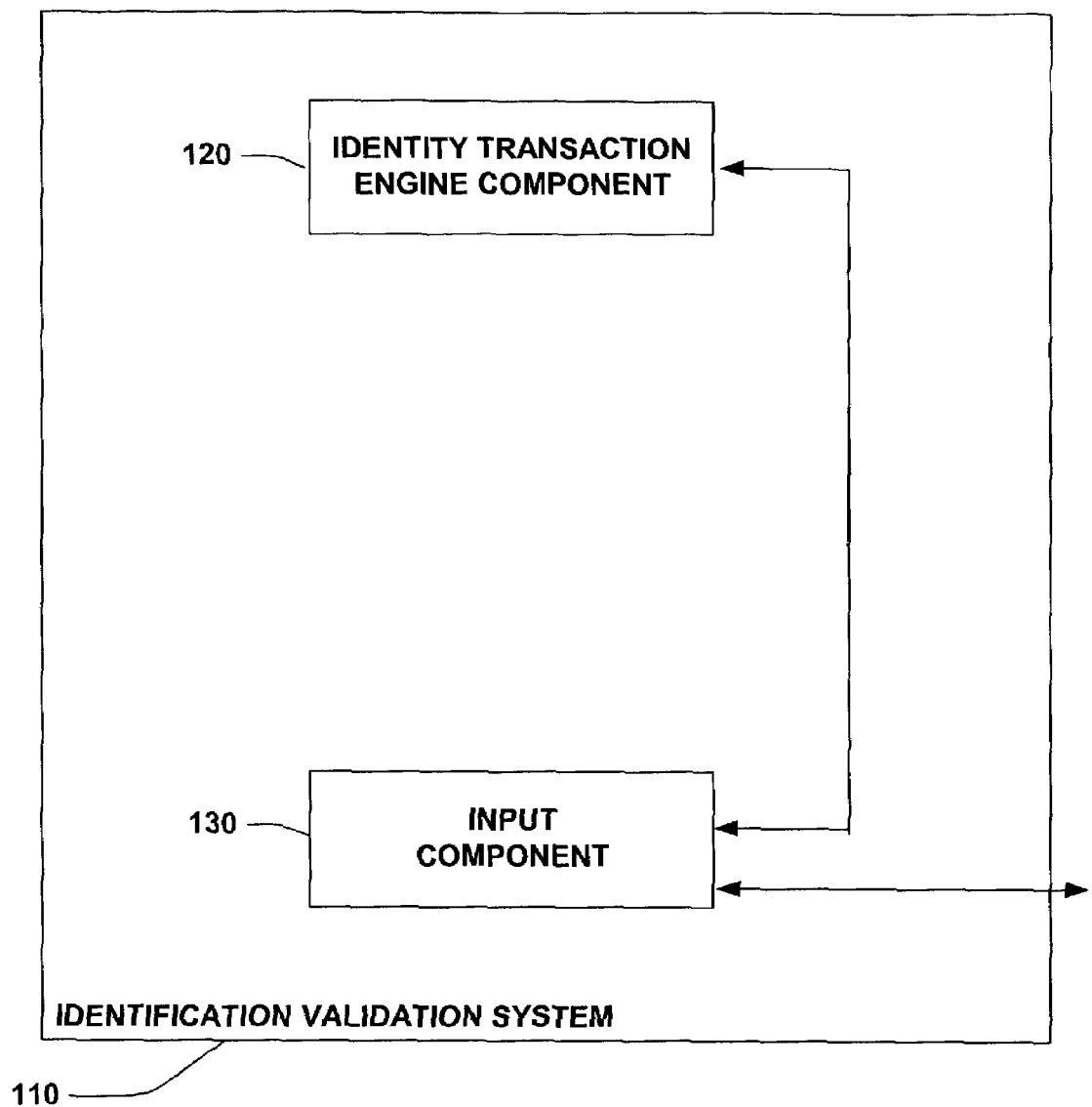
FIG. 1 is a schematic block diagram of an identification validation system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident to one skilled in the art that the present invention may be practiced without these specific details. In other instances, well-known structures and devices are shown in block diagram form in order to facilitate description of the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component.

"Entity" is intended to include person(s) and/or object(s) (e.g., motor vehicle(s) and/or watercraft) desiring or attempting to engage in a regulated transaction. Further, "regulated transaction" includes transactions regulated and/or restricted by governmental and/or private concerns. Regulated transactions include, but are not limited to, voting, purchasing an alcoholic product, purchasing a tobacco product, sending a letter, shipping a package, shipping a letter, purchasing a ticket for a mode of transportation, boarding a mode of transportation, transporting a hazardous material, entering a restricted area, entering a restricted building, entering a restricted facility, purchasing a fire arm, obtaining employment, retaining employment, requesting financial aid for education, engaging in a financial transaction, obtaining admission to an institution, obtaining permission to enter a country, entering a country, obtaining a license, obtaining an identification document, obtaining permission to vote and/or granting work authorization.

Referring to FIG. 1, an identification validation system 110 is illustrated. The system 100 includes an identity transaction engine component 120 and an input component 130.

The input component 130 facilitates identification of an entity (e.g., person(s) and/or object(s)) seeking to engage in a regulated transaction to the identity transaction engine component 120. The input component 130 can receive information from input device(s), for example, a card reader, a magnetic card reader, keyboard, a touch screen device, a DNA fingerprint analyzer, a DNA profile analyzer, an iris scanner, a retinal scanner, a thumb print reader, a digital camera, a pointing device, such as a mouse, a microphone, an IR remote control, a joystick, a game pad, a personal digital assistant (PDA), a smart card or the like. The input component 130 can provide information to the identity transaction engine component 120, for example, identifying a regulated transaction, identifying a requested action and/or identifying an entity desiring to engage in the regulated transaction.

Based, at least in part, upon information obtained from the input component 130, the identity transaction engine component 120 can search data store(s) in order to validate identification of a person, for example, related to a regulated transaction. It is to be understood and appreciated that the present invention is not limited by these examples and that any appropriate manner of identifying an entity to the input component 130 is encompassed by this invention.

The identity transaction engine component 120 can search data store(s) in order to validate identity (e.g., related to a regulated transaction). The identity transaction engine component 120 can be adapted to utilize attribute(s) of a regulated transaction in performing a search of data store(s). For example, for age regulated transaction(s) (e.g., voting, purchasing alcohol and/or tobacco product(s)), the identity transaction engine component 120 can utilize the attribute of a person's date of birth and/or age in order to determine whether the regulated transaction should be permitted. Other examples of regulated transactions include, but are not limited to, transporting hazardous material(s), sending a letter, shipping an item (e.g., package and/or letter), driving in restricted area(s), renting vehicle(s), purchasing fire arm(s), requesting financial aid for college tuition, purchasing a ticket for a mode of transportation (e.g., aircraft, bus and/or ship) and/or boarding a mode of transportation. Other examples of attribute(s) include, but are not limited to, DNA fingerprint and/or profile, ethnicity, citizenship, religious affiliation, political affiliation, biometric data, height, weight, health status (e.g., failure to have particular disease(s)), gender, registration status with Selective Service, history of conviction of felony and/or inclusion on list(s) of governmental agencies and/or private groups.

The identification validation system 110 can communicate with remote system(s) (not shown) (e.g., database(s) and/or data storage system(s). For example, the identification validation system 110 can search the remote system(s) (not shown) based, at least in part, upon information associated with a person's identity (e.g., name, address, social security number, identification number, passport number, selective service number, voter identification number and/or date of birth) in order to validate and/or verify identity and possession of attribute(s) to engage in a regulated transaction.

The identification validation system 110 can be coupled to remote system(s) (not shown) utilizing, for example, a telephone connection, a network connection, an extranet, an intranet, the Internet, wireless communication, a satellite link, direct serial communication and/or direct parallel communication. Information exchanged between the identification validation system 110 and remote system(s) (not shown) can be accomplished using a variety of format(s). Information exchanged between the identification validation system 110 and remote system(s) (not shown) can be performed in a variety of secure and/or encrypted manners.

Figure 2:
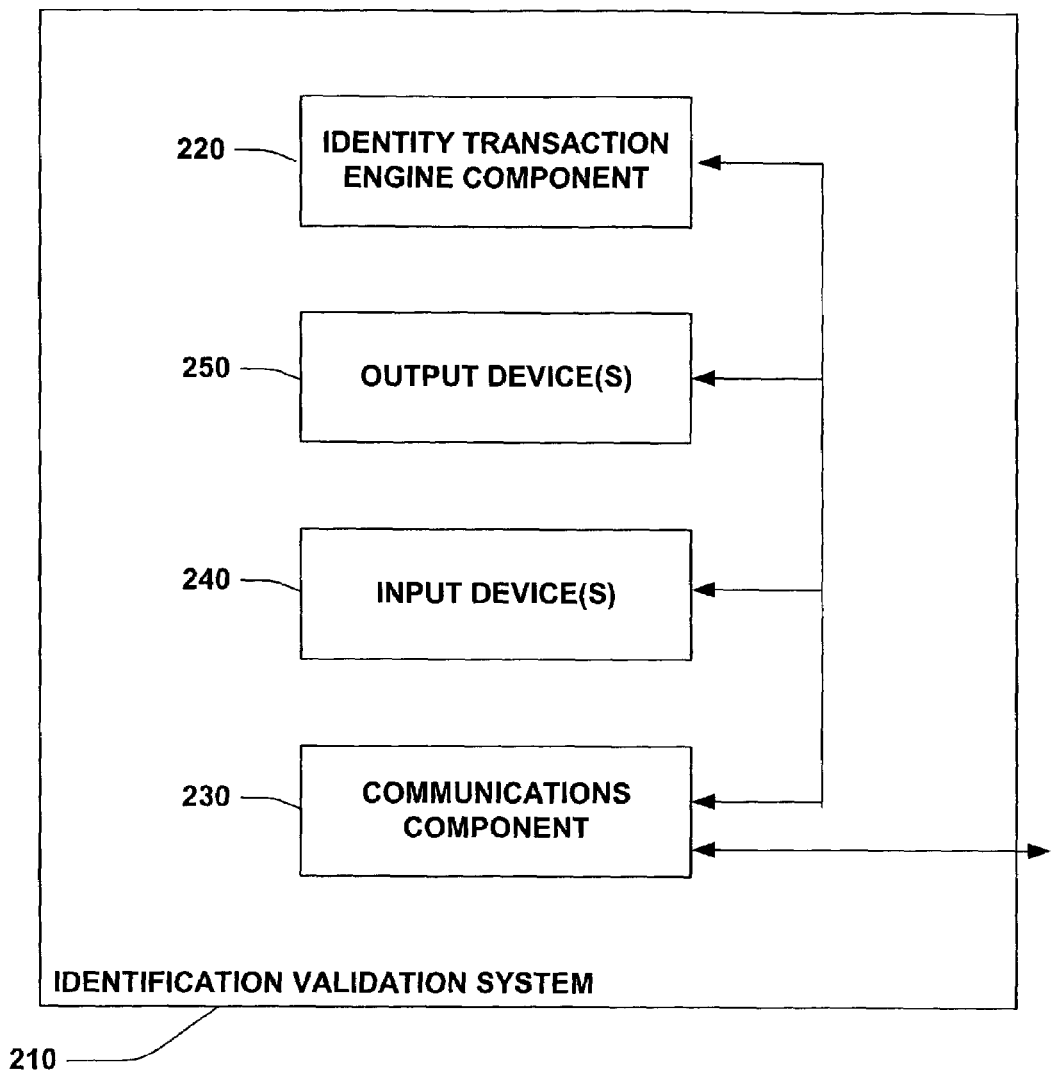
FIG. 2 is a schematic block diagram of an identification validation system in accordance with an aspect of the present invention.

Next, referring to FIG. 2, an identification validation system 210 is illustrated. The system 210 includes an identity transaction engine component 220, a communications component 230 and input device(s) 240. Optionally, the system 210 can include output device(s) 250. The output device(s) 250 can forward data packet(s) to yet other systems (not shown) to provide information about the identity verification transaction, including system decision(s). These other systems (not shown) may utilize the information provided in these data packet(s) to take some predefined further action (e.g., remove passenger baggage from an aircraft, notify the Amber system, etc.).

The identity transaction engine component 220 facilitates searching of data store(s) (not shown) in order to validate identity related to a regulated transaction. The identity transaction engine component 220 can be adapted to utilize attribute(s) of a regulated transaction in performing a search of data store(s). For example, for a person seeking to board an aircraft, the identity transaction engine component can utilize the attribute(s) of a person's DNA fingerprint, name, date of birth and/or age in order to determine whether the person is on a governmental list of suspected terrorists, fleeing felons and/or fugitives from justice. A person on one of these governmental list(s) would be denied permission to board the aircraft.

The communications component 230 facilitates communication between the identification validation system 210 and remote system(s) (not shown) utilizing, for example, a network connection, an extranet, an intranet, the Internet, wireless communication, direct serial communication and/or direct parallel communication. Information exchanged between the communications component 230 and remote system(s) (not shown) can be accomplished using a variety of format(s). Information exchanged between the system identification validation system 210 and remote system(s) (not shown) can be performed in a variety of secure and/or encrypted manners. For example, the communications component 230 can be coupled to the remote system(s) (not shown) utilizing a high-speed, secure Internet connection.

The input device(s) 240 facilitates identification of an entity (e.g., person) seeking to engage in a regulated transaction. The input device(s) 240 can include a card reader, a magnetic card reader, keyboard, a touch screen device, an iris scanner, a retinal scanner, a thumb print reader, a digital camera, a pointing device, such as a mouse, a microphone, an IR remote control, a joystick, a game pad, a personal digital assistant (PDA), a smart card reader, a podium, or the like. Based at least in part upon information obtained from the input device(s), the identity transaction engine component can search data store(s) in order to validate identification of a person, for example, related to a regulated transaction.

The input device(s) 240 can further include a DNA fingerprint and/or profile analyzer. For example, a DNA sample (e.g., blood, hair and/or skin sample) can be acquired from a person desiring to engage in a regulated transaction. A DNA fingerprint and/or profile of the DNA sample can be sent by the DNA fingerprint and or profile analyzer to the identity transaction engine component 220. The identity transaction component 220 can analyze the DNA sample and/or compare it to DNA fingerprint and/or profile information stored in data store(s). Thus, based at least in part upon the DNA sample, the identity transaction engine component 220 can determine whether the entity possesses attribute(s) required to engage in the regulated transaction.

It is to be understood and appreciated that the present invention is not limited by these examples and that any appropriate manner of identifying an entity to the identity transaction engine component 220 is encompassed by this invention.

Optionally, the system 200 can include output device(s) 250 which facilitate communication to user(s) of the system 200. The output device(s) 250 can include, a touch screen device, a computer monitor, a television screen, a printer, a personal digital assistant, a wireless telephone display and/or speaker(s). The output device(s) 250 can facilitate communication of result(s) obtained by the identity transaction engine component 220 to a user of the system 200. It is to be understood and appreciated that the present invention is not limited by these examples and that any appropriate manner of communicating information to and/or from the identity transaction engine component 220 is encompassed by this invention. It is further to be appreciated that based at least in part upon result(s) of the identity transaction engine component 220, the regulated transaction can be allowed, the regulated transaction can be refused and/or other action(s) can be initiated (e.g., based at least in part upon attribute(s) of related to the regulated transaction.)

Figure 3:
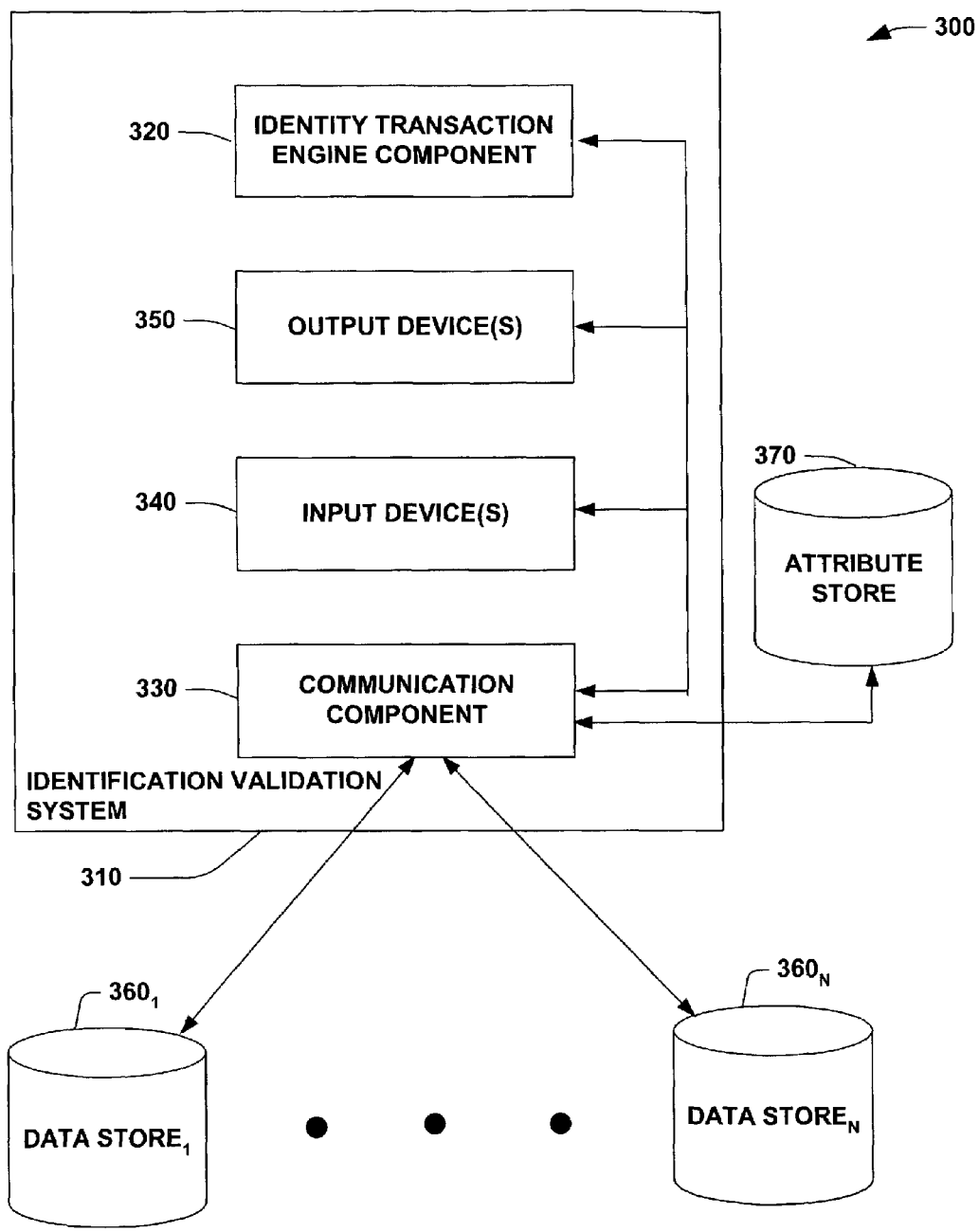
FIG. 3 is a schematic block diagram of a regulated transaction authorization system in accordance with an aspect of the present invention.

Turning to FIG. 3, a regulated transaction authorization system 300 is illustrated. The system 300 includes an identification validation system 310 having an identity transaction engine component 320, a communications component 330, input device(s) 340 and, optionally, output device(s) 350. The system 300 further includes a first data store $360_1$ through an Nth data store $360_N$, N being an integer greater to or equal to one. The data stores $360_1$ through $360_N$ can be referred to collectively as the data store(s) 360.

The identity transaction engine component 320 facilitates determination of which data store(s) 360 are relevant to a particular regulated transaction and/or facilitates searching of data store(s) 360 in order to authorize a regulated transaction. The identity transaction engine component 320 can be adapted to utilize attribute(s) of a regulated transaction in performing a search of data store(s) 360 (e.g., regulated transaction(s) can have differing attribute(s)). For example, for a person seeking to vote in an election, the identity transaction engine component can utilize a person's name, date of birth, and/or voter's registration number in order to determine whether the person is a registered voter and/or eligible to vote. Even if the person is officially registered to vote, the identity transaction engine component 320 can determine whether to cross check the official registration against other data store(s) 360 to determine if there are any other impediments to voting (e.g., the voter is deceased, is a felon and/or has renounced his/her citizenship). Further, the identity transaction engine component 320 can determine whether the person has already voted in the subject election. Person(s) not registered to vote, convicted of a felony and/or who had already voted in the subject election would not be permitted to vote. The identity transaction engine component 320 can further facilitate determining whether a proposed regulated transaction is logical (e.g., a person boarding an aircraft in New York should not be simultaneously in Seattle). The identity transaction engine component 320 can determine data store(s) 360 to be searched base at least in part upon information stored in the attribute store 370.

The communications component 330 facilitates communication between the identification validation system 310 and the data store(s) 360 utilizing, for example, a network connection, an extranet, an intranet, the Internet, wireless communication, direct serial communication and/or direct parallel communication. Information exchanged between the communications component 330 and the data store(s) 360 can be accomplished using a variety of format(s). Information exchanged between the system identification validation system 310 and data store(s) 360 can be performed in a variety of secure and/or encrypted manners. For example, the communications component 330 can be coupled to the data store(s) 360 utilizing a high-speed, secure Internet connection.

The input device(s) 340 facilitate identification of an entity (e.g., person) seeking to engage in a regulated transaction. The input device(s) 340 can include a card reader, a magnetic card reader, keyboard, a touch screen device, an iris scanner, a retinal scanner, a thumb print reader, a digital camera, a DNA fingerprint analyzer, a DNA profile analyzer, a pointing device, such as a mouse, a microphone, an IR remote control, a joystick, a game pad, a personal digital assistant (PDA), a smart card or the like. Based at least in part upon information obtained from the input device(s) 340, the identity transaction engine component 320 can search data store(s) 360 in order to determine whether an entity is authorized to engage in a regulated transaction. It is to be understood and appreciated that the present invention is not limited by these examples and that any appropriate manner of identifying an entity to the identity transaction engine component 320 is encompassed by this invention.

Optionally, the regulated transaction authorization system 300 can include output device(s) 350 which facilitate communication to user(s) of the system 300. The output device(s) 350 can include, a touch screen device, a computer monitor, a television screen, a printer, a personal digital assistant, a wireless telephone display, speaker(s), and/or another computer system. The output device(s) 350 can facilitate communication of result(s) obtained by the identity transaction engine component 320 to a user of the regulated transaction authorization system 300. It is to be understood and appreciated that the present invention is not limited by these examples and that any appropriate manner of communicating information to and/or from the identity transaction engine component 320 is encompassed by this invention.

The data store(s) 360 include information associated with identification of entities (e.g., people). For example, the data store(s) 360 can be governmental (Federal, state, regional and/or local) data store(s) related to, for example, the Social Security Administration, Drivers' license agencies (e.g., Bureau/Department of Motor Vehicles), state identification card issuing agencies, the Selective Service system, the military, voter registration, birth certificates issuing authorities, the Immigration and Naturalization Service, the Justice Department, the Bureau of Alcohol, Tobacco and Firearms, the Federal Bureau of Investigation and/or the Central Intelligence Agency. The data store(s) 360 can also include private, non-governmental, data store(s) that can include, for example, a periodically updated copy of governmental data and/or a new set of data about an individual. Additionally, the data store(s) 360 can include DNA information (e.g., collected by governmental and/or private entities) and/or other biometric information. Information can be stored in the data store(s) 360 in a variety of format(s) including, but not limited to, hierarchical database(s) and/or relational database(s). Information can be stored in the data store(s) 360 in a variety of data structure(s) including, but not limited to, lists, arrays, databases and/or datacubes. For example, information stored in the data store(s) can be text (e.g., alphanumeric), graphical, audio, video and/or digitally stored DNA information.

The attribute store 370 can store information related to regulated transaction(s) (e.g., attribute(s)). Based at least in part upon information in the attribute store 370, the identity transaction engine component 320 can determine which data store(s) 360 to search, which output device(s) 350 (if any) to forward the resulting information or decision(s) and/or whether the data is to be re-captured through the input device(s) 340. Information can be stored in the attribute store 370 statically and/or dynamically.

For example, information stored in the attribute store 370 can act as static and/or dynamic rule(s) to be applied to regulated transaction(s) processed by the transaction engine component 320. Thus, rule(s) can be defined such that transactions that are improbably and/or impossible are identified for further processing and/or review. Additionally, rule(s) can be applied to data flowing through the transaction engine component 320 to mitigate authorization of undesired regulated transaction(s).

Figure 4:
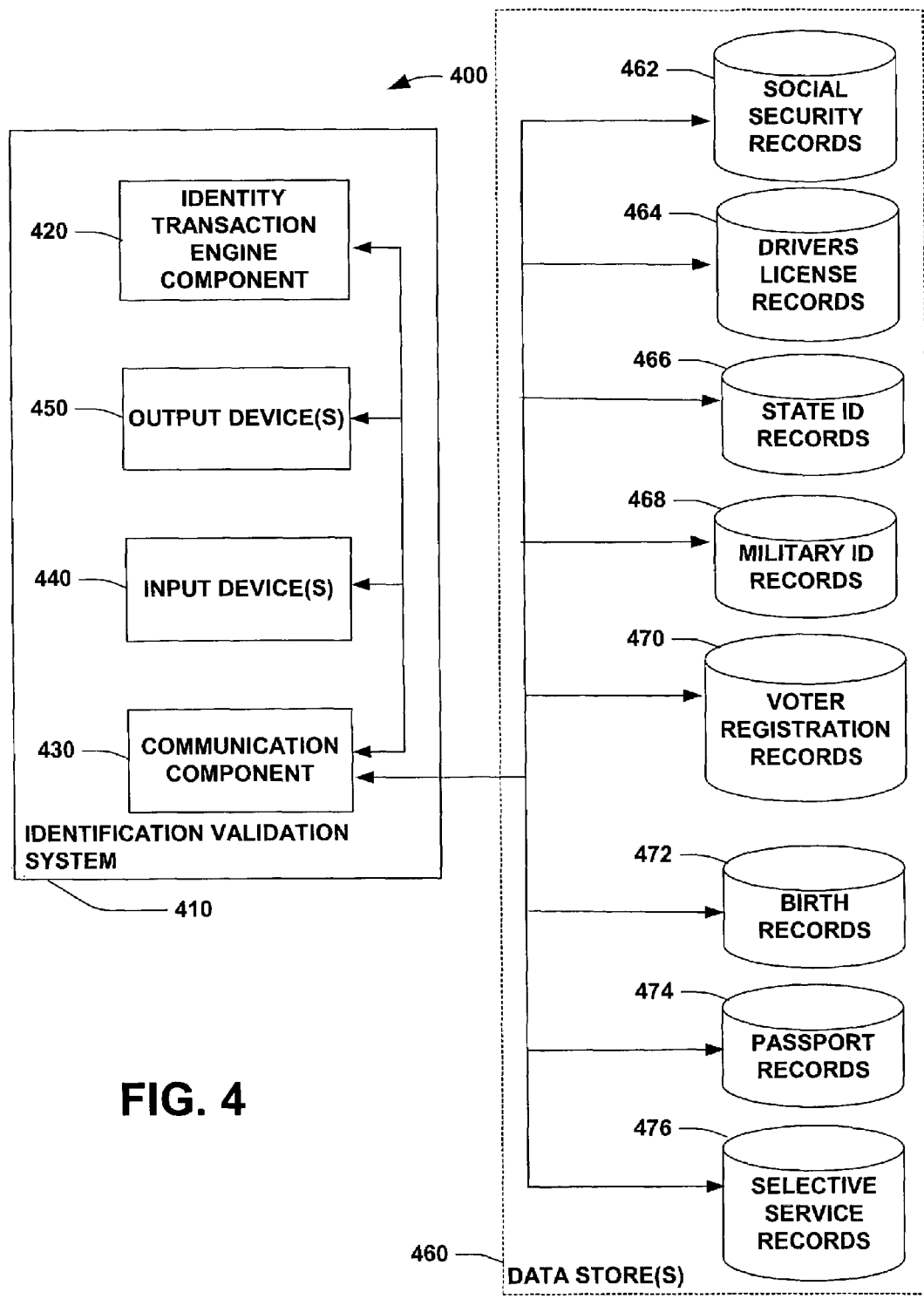
FIG. 4 is a schematic block diagram of a regulated transaction authorization system in accordance with an aspect of the present invention.

Turning to FIG. 4, a regulated transaction authorization system 400 is illustrated. The system 400 includes an identification validation system 410 having an identity transaction engine component 420, a communications component 430, input device(s) 440 and, optionally, output device(s) 450. The system 400 further includes at least one data store(s) 460 which can be associated with social security records 462, drivers license records 464, state ID records 466, military ID records 468, voter registration records 470, birth records 472, passport records 474 and/or selective service records 476. The data stores set forth in FIG. 4, are only examples of such data stores that can be employed in order to validate identity with regard to regulated transaction(s). Such data stores can be within or outside of the United States of America. Other data stores may include, but are not limited to tax records, identity card data stores, retirement records, pension records and/or baptismal data stores.

The identity transaction engine component 420 facilitates searching of data store(s) 460 in order to validate and/of verify identification related to a regulated transaction. The identity transaction engine component 420 can be adapted to utilize attribute(s) of a regulated transaction in performing a search of data store(s) 460.

The communications component 430 facilitates communication between the identification validation system 410 and the at least one data store(s) 460 utilizing, for example, a network connection, an extranet, an intranet, the Internet, wireless communication, direct serial communication and/or direct parallel communication. Information exchanged between the communications component 430 and the at least one data store(s) can be accomplished using a variety of format(s). Information exchanged between the identification validation system 410 and the at least one data store(s) 460 can be performed in a variety of secure and/or encrypted manners. For example, the communications component 430 can be coupled to the at least one data store(s) 460 utilizing a high-speed, secure Internet connection.

The input device(s) 440 facilitates identification of an entity (e.g., person) seeking to engage in a regulated transaction. The input device(s) 440 can include a card reader, a magnetic card reader, a bar code reader, keyboard, a touch screen device, an iris scanner, a retinal scanner, a thumb print reader, a digital camera, a DNA fingerprint analyzer, a DNA profile analyzer, a pointing device, such as a mouse, a microphone, an IR remote control, a joystick, a game pad, a personal digital assistant (PDA), a smart card reader or the like. Based at least in part upon information obtained from the input device(s) 440, the identity transaction engine component 420 can search data store(s) 460 in order to validate identification of an entity related to a regulated transaction. It is to be understood and appreciated that the present invention is not limited by these examples and that any appropriate manner of identifying an entity to the identity transaction engine component 420 is encompassed by this invention.

Optionally, the system 400 can include output device(s) 450 which facilitate communication to user(s) of the system 400. The output device(s) 450 can include, a touch screen device, a computer monitor, a television screen, a printer, a personal digital assistant, a wireless telephone display and/or speaker(s). The output device(s) 450 can facilitate communication of result(s) obtained by the identity transaction engine component 420 to a user of the system 400. It is to be understood and appreciated that the present invention is not limited by these examples and that any appropriate manner of communicating information to and/or from the identity transaction engine component 420 is encompassed by this invention.

The at least one data store(s) 460 can be, for example, associated with social security records 462, drivers license records 464, state ID records 466, military ID records 468, voter registration records 470, birth records 472, passport records 474 and/or selective service records 476 and include information associated with identification of entities (e.g., persons). Information can be stored in a variety of format(s)

including, but not limited to, hierarchical database(s) and/or relational database(s). Information can be stored in a variety of data structure(s) including, but not limited to, lists, arrays, databases and/or datacubes. For example, information stored in the data store(s) 460 can be text, alphanumeric, graphical, audio, video, digitized DNA information and/or a variety of digitized information.

In view of the exemplary systems shown and described above, methodologies that may be implemented in accordance with the present invention, will be better appreciated with reference to the flow charts of FIGS. 5, 6, 7, 8, 9, 10, 11, 12, 13 and 14. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention. In addition, it will be appreciated that the exemplary methods 500, 600, 700, 800, 900, 1000, 1100, 1200, 1300 and 1400 and other methods according to the invention may be implemented in association with the identification validation system illustrated and described herein, as well as in association with other systems and apparatus not illustrated or described.

The invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Figure 5:
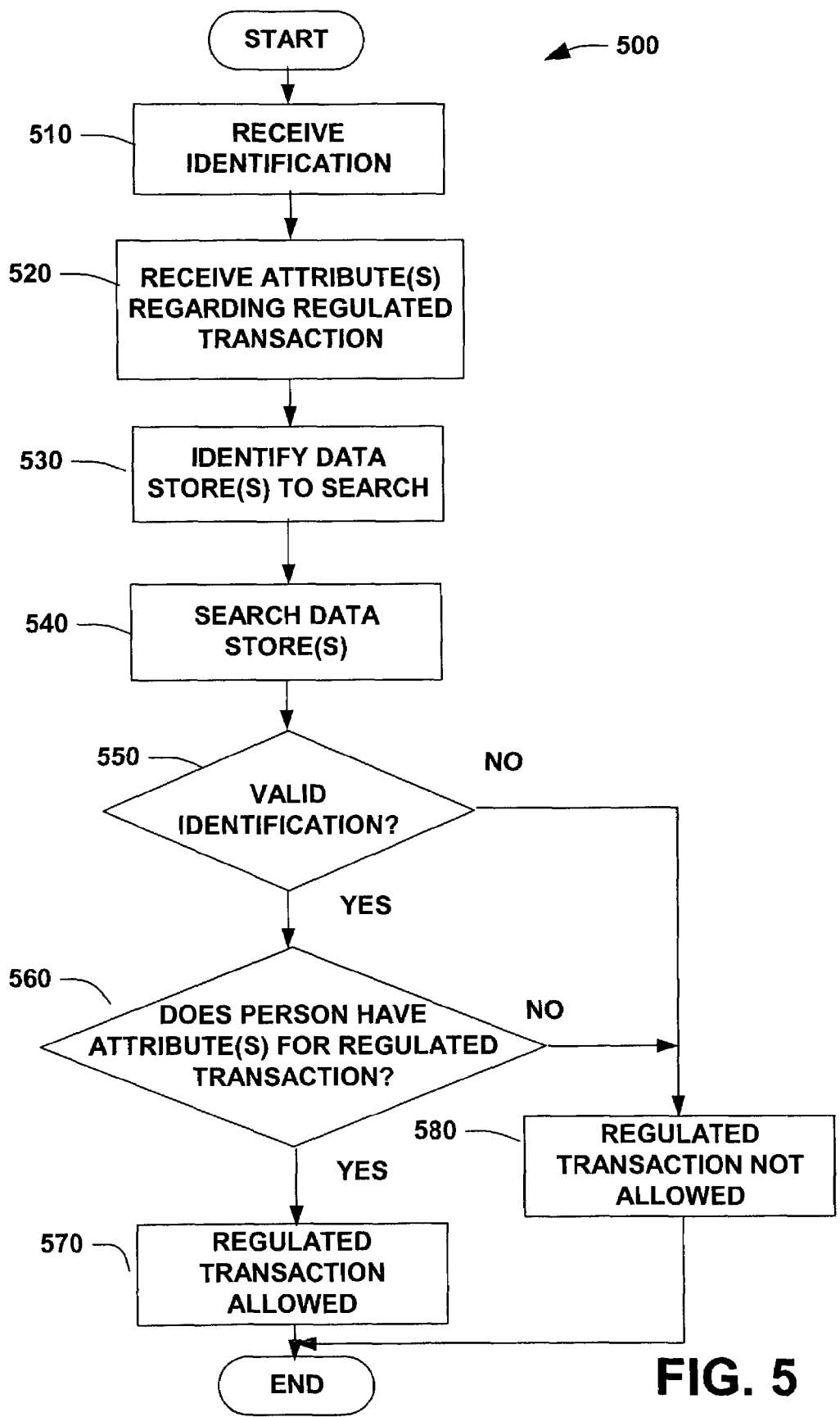
FIG. 5 is a flow chart illustrating a methodology for identification validation for a regulated transaction in accordance with an aspect of the present invention.

Turning to FIG. 5, a methodology 500 for identification validation for a regulated transaction in accordance with an aspect of the present invention is illustrated. At 510, identification (e.g., DNA sample, driver's license, state identification card, military identification card, vehicle license plate, vehicle identification number, and/or passport) is received (e.g., utilizing a magnetic card reader, or a device appropriate to capture the data from the identification at hand). At 520, attribute(s) regarding the regulated transaction are received. For example, attribute(s) can be age, status of driver's license (e.g., valid, invalid and/or suspended), gender, registration status with Selective Service, status on various governmental agency list(s) and/or status on various private entity list(s)). Next, at 530, data store(s) to be searched are identified, for example, based at least in part upon attribute(s) related to the regulated transaction—driver's license data store(s) can be searched for an alcohol purchasing transaction, while governmental agency list(s) data store(s) can be searched for an airport boarding transaction. At 540, the data store(s) identified are searched (e.g., by an identity transaction engine component). At 550, a determination is made whether the identification is valid. If the determination at 550 is NO, processing continues at 580. If the determination at 550 is YES, at 560, a determination is made whether the person has the attribute(s) for the regulated transaction. If the determination at 560 is NO, processing continues at 580. If the determination at 560 is YES, at 570, the regulated transaction is allowed and no further processing occurs. At 580, the regulated transaction is not allowed and no further processing occurs.

Figure 6:
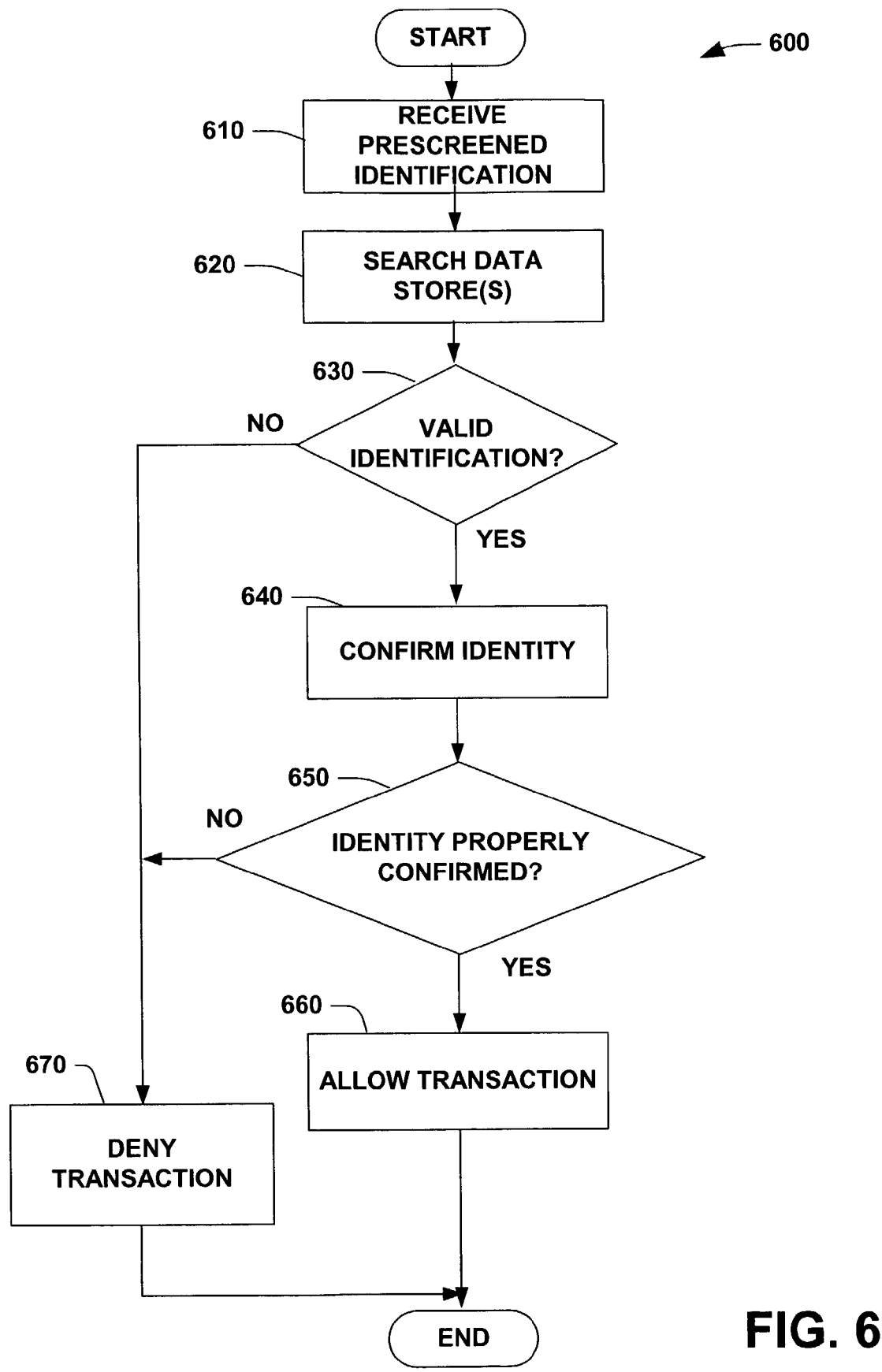
FIG. 6 is a flow chart illustrating a methodology for identification validation for a regulated transaction in accordance with an aspect of the present invention.

Turning to FIG. 6, a methodology 600 for identification validation for a regulated transaction in accordance with an aspect of the present invention is illustrated. At 610, prescreened identification is received. For example, a person who frequently engages in air travel can voluntarily subject himself to investigation by a prescreening authority (e.g., by a governmental agency and/or private entity) and thus, become, "prescreened". The prescreening authority (e.g., governmental agency and/or private entity) can, for example, update the person's "prescreened" status (e.g., by monitoring list(s) of suspected terrorists, fleeing felons and/or fugitives from justice). Next, at 620, data store(s) (e.g., a data store of prescreened persons) is searched. At 630, a determination is made whether the identification is valid. If the determination at 630 is NO, processing continues at 670. If the determination at 630 is YES, at 640, the person's identity is confirmed (e.g., utilizing a secure password, DNA fingerprint analyzer, iris scanner, retinal scanner and/or fingerprint reader). At 650 a determination is made whether the identity was properly confirmed. If the determination at 650 is NO, processing continues at 670. If the determination at 650 is YES, at 660, the regulated transaction is allowed and no further processing occurs. At 670, the regulated transaction is denied.

Figure 7:
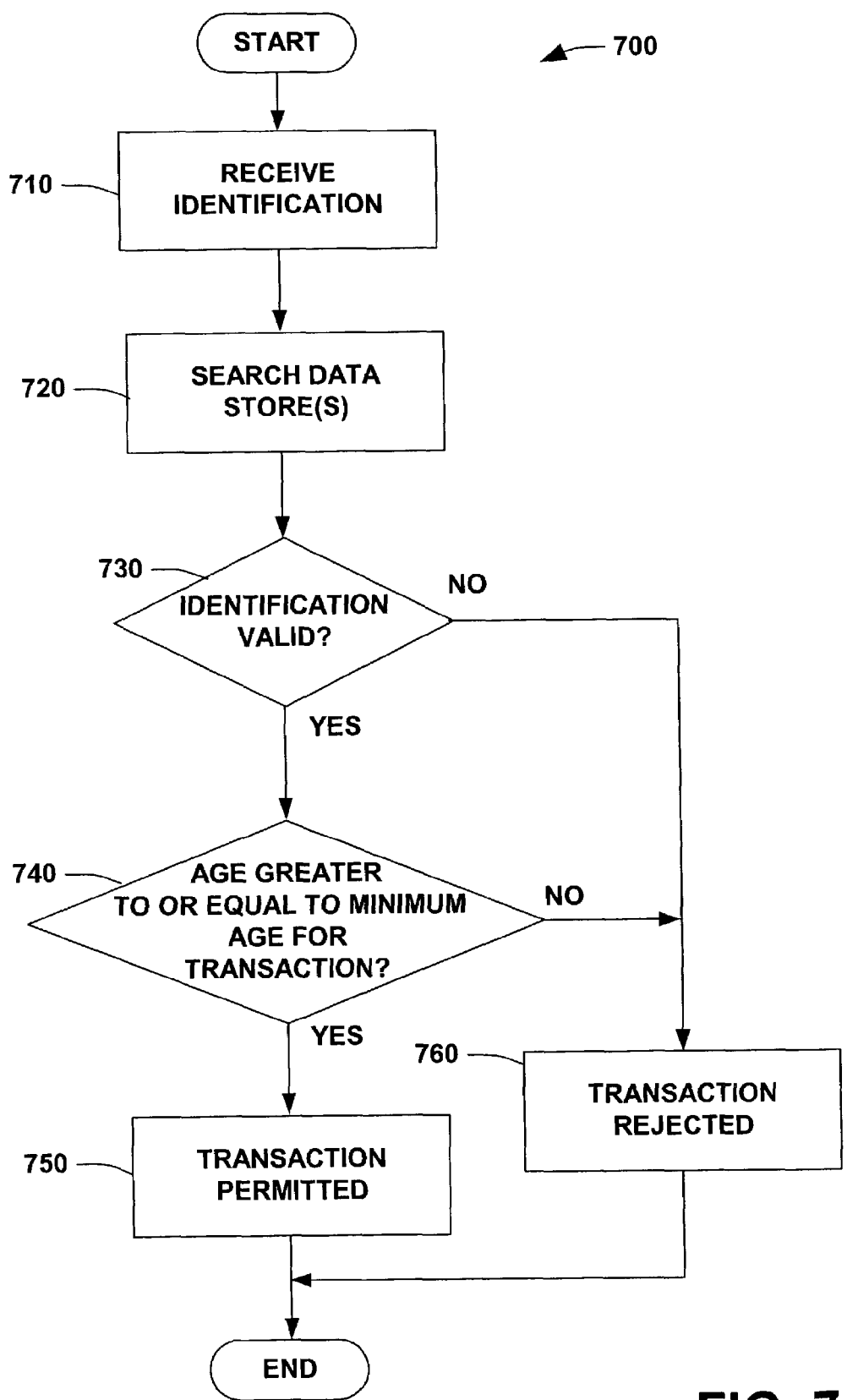
FIG. 7 is a flow chart illustrating a methodology for identification validation for a regulated transaction in accordance with an aspect of the present invention.

Referring to FIG. 7, a methodology 700 for identification validation for a regulated transaction in accordance with an aspect of the present invention is illustrated. For example, the regulated transaction (e.g., purchase of alcohol and/or tobacco product(s)) can be based at least in part upon a single attribute (e.g., age) or a plurality of attributes. At 710, identification is received (e.g., utilizing a magnetic card reader). At 720, data store(s) are searched (e.g., by an identity transaction engine component). At 730, a determination is made whether the identification is valid. If the determination at 730 is NO, processing continues at 760. If the determination at 730 is YES, at 740, a determination is made whether the person's age is greater to or equal to the minimum age for the transaction (e.g., purchasing alcohol and/or tobacco products). If the determination at 740 is NO, processing continues at 760. If the determination at 740 is YES, at 750, the transaction is permitted and no further processing continues. At 760, the transaction is rejected.

Figure 8:
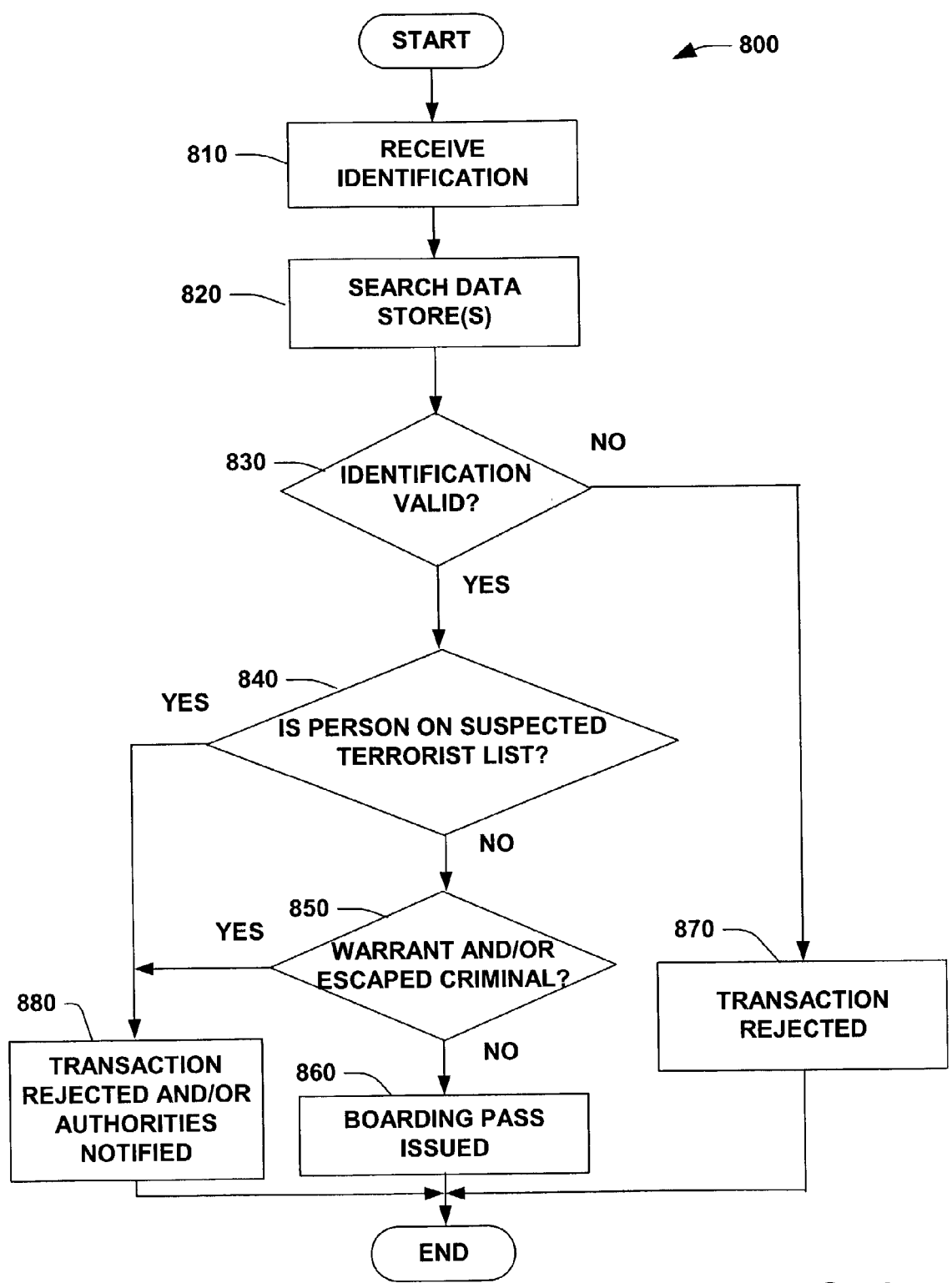
FIG. 8 is a flow chart illustrating a methodology for identification validation for a regulated transaction in accordance with an aspect of the present invention.

Next, turning to FIG. 8, a methodology 800 for identification validation for a regulated transaction in accordance with an aspect of the present invention is illustrated. For example, the regulated transaction can be related to boarding an aircraft. At 810, identification is received (e.g., utilizing a magnetic card reader). For example, the identification can be a driver's license, state identification card, military identification card and/or passport. At 820, data store(s) (e.g., list(s) of suspected terrorists, fleeing felons and/or fugitives from justice) are searched (e.g., by an identity transaction engine component). At 830, a determination is made whether the identification is valid. If the determination at 830 is NO, processing continues at 870. If the determination at 830 is YES, at 840, a determination is made whether the person is on a suspected terrorist list. If the determination at 840 is YES, processing continues at 880. If the determination at 840 is NO, at 850, a determination is made whether the person has a warrant and/or is an escaped criminal (e.g., fleeing felon and/or fugitive from justice). If the determination at 850 is YES, processing continues at 880. If the determination at 850 is NO, at 860, a boarding pass is issued for the person and no further processing occurs. At 870, the transaction is rejected (e.g., no boarding pass issued) and no further processing occurs. At 880, the transaction is rejected (e.g., no boarding pass issued) and/or the authorities (e.g., Federal, State and/or local law enforcement agencies) are notified.

Figure 9:
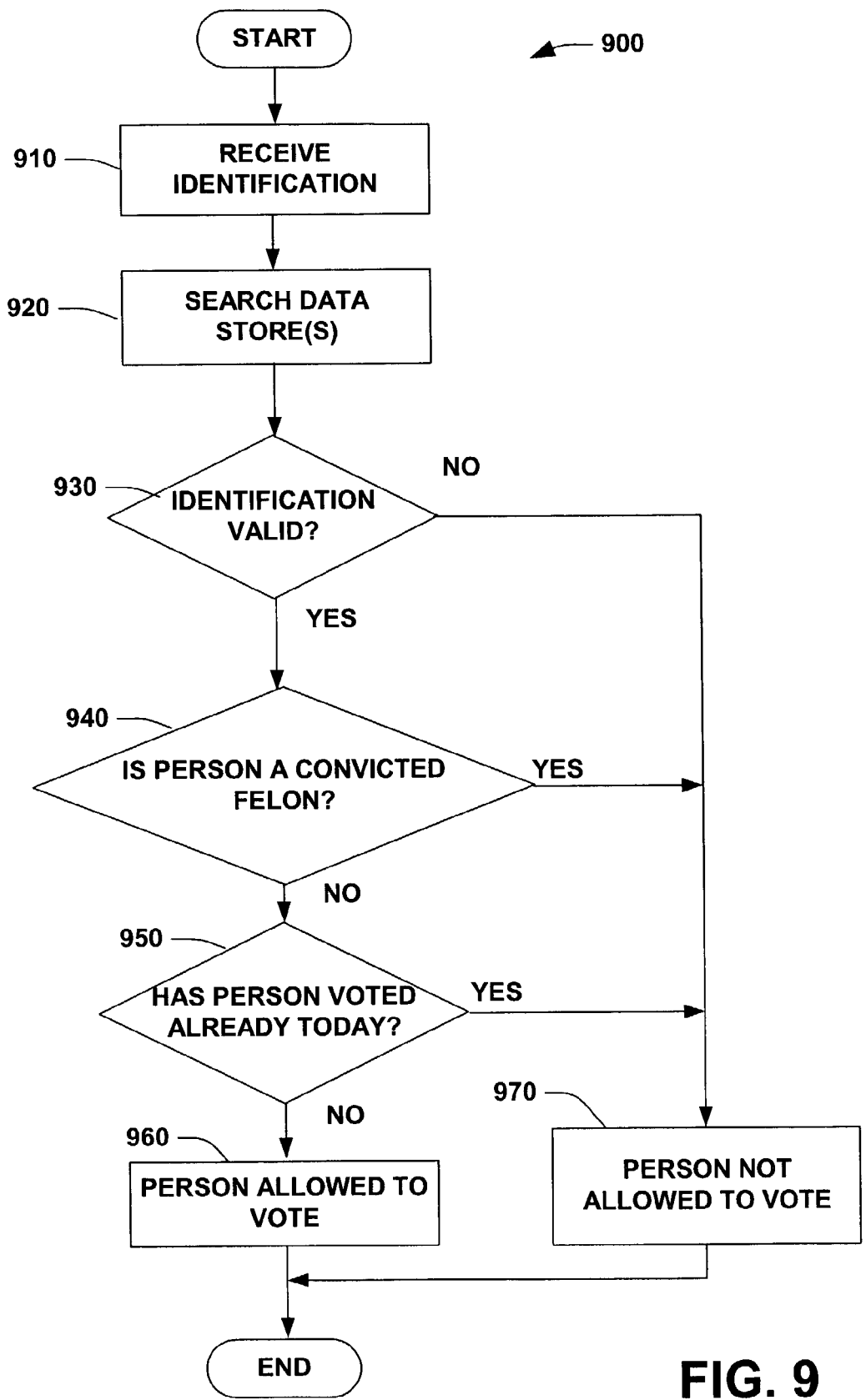
FIG. 9 is a flow chart illustrating a methodology for identification validation for a regulated transaction in accordance with an aspect of the present invention.

Referring next to FIG. 9, a methodology 900 for identification validation for a regulated transaction in accordance with an aspect of the present invention is illustrated. For example, the regulated transaction can be voting in an election. At 910, identification is received (e.g., utilizing a magnetic card reader). For example, the identification can be a driver's license, voter's registration card, state identification card, military identification card, vehicle license plate, vehicle identification number, and/or passport. At 920, data store(s) (e.g., list(s) of suspected terrorists, fleeing felons and/or fugitives from justice and/or voter registration record(s)) are searched (e.g., by an identity transaction engine component). At 930, a determination is made whether the identification is valid. If the determination at 930 is NO, processing continues at 970. If the determination at 930 is YES, at 940, a determination is made whether the person is a convicted felon. If the determination at 940 is YES, processing continues at 970. If the determination at 940 is NO, at 950, a determination is made whether the person has already voted in the subject election. If the determination at 950 is YES, processing continues at 970. If the determination at 950 is NO, at 960, the person is allowed to vote and no further processing occurs. At 970, the person is not allowed to vote.

Figure 10:
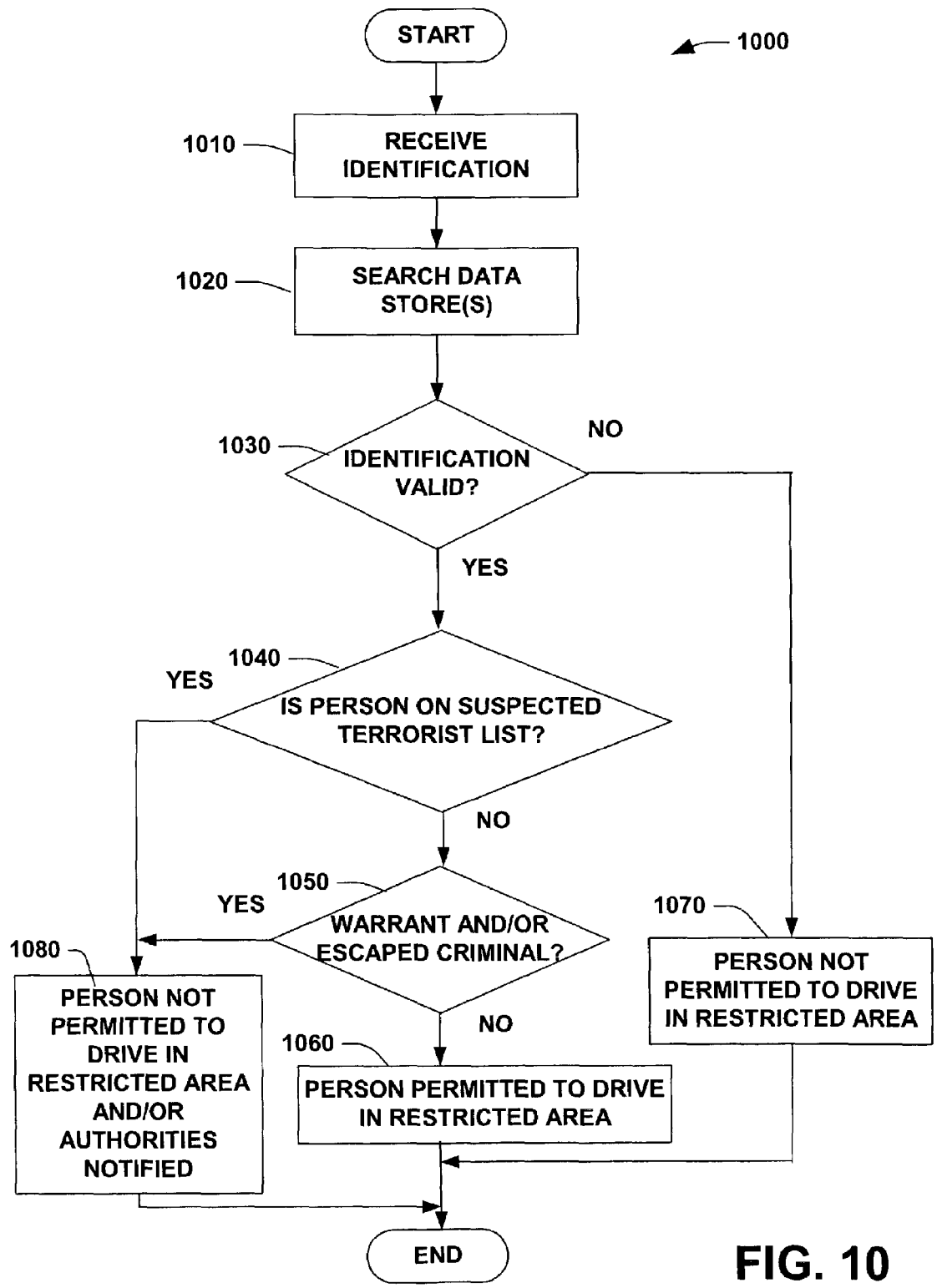
FIG. 10 is a flow chart illustrating a methodology for identification validation for a regulated transaction in accordance with an aspect of the present invention.

Turning next to FIG. 10, a methodology 1000 for identification validation for a regulated transaction in accordance with an aspect of the present invention is illustrated. For example, the regulated transaction can be related to driving in a restricted area (e.g., through a tunnel). At 1010, identification is received (e.g., utilizing a magnetic card reader). For example, the identification can be a driver's license, state identification card, military identification card, vehicle license plate, vehicle identification number, and/or passport. At 1020, data store(s) (e.g., list(s) of suspected terrorists, fleeing felons and/or fugitives from justice) are searched (e.g., by an identity transaction engine component). At 1030, a determination is made whether the identification is valid. If the determination at 1030 is NO, processing continues at 1070. If the determination at 1030 is YES, at 1040, a determination is made whether the person is on a suspected terrorist list. If the determination at 1040 is YES, processing continues at 1080. If the determination at 1040 is NO, at 1050, a determination is made whether the person has a warrant and/or is an escaped criminal (e.g., fleeing felon and/or fugitive from justice). If the determination at 1050 is YES, processing continues at 1080. If the determination at 1050 is NO, at 1060, the person is permitted to drive in the restricted area and no further processing occurs. At 1070, the person is not permitted to drive in the restricted area and no further processing occurs. At 1080, the person is not permitted to drive in the restricted area and/or the authorities (e.g., Federal, State and/or local law enforcement agencies) are notified and no further processing occurs.

Figure 11:
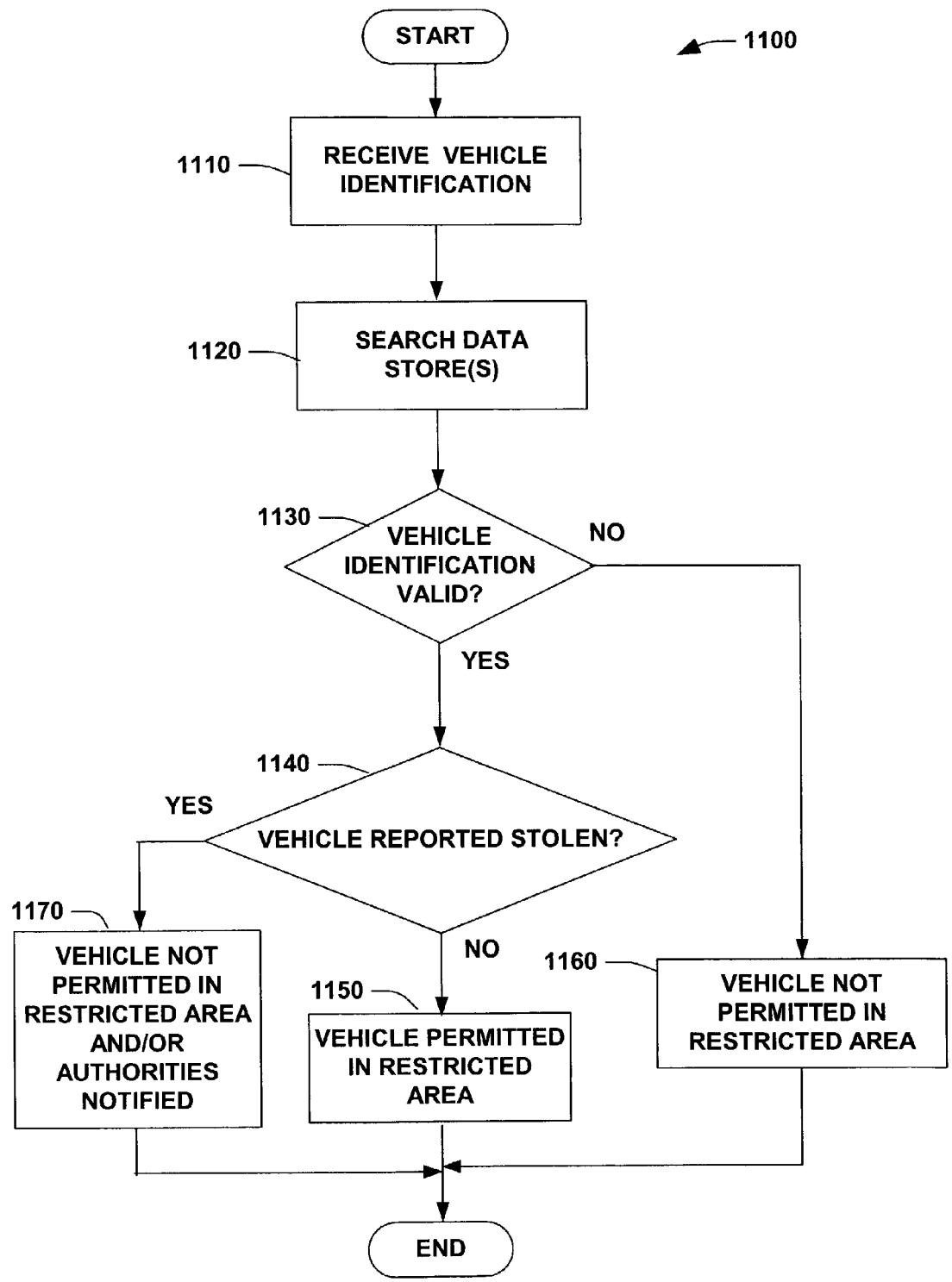
FIG. 11 is a flow chart illustrating a methodology for identification validation for a regulated transaction in accordance with an aspect of the present invention.

Referring to FIG. 11, a methodology 1100 for identification validation for a regulated transaction in accordance with an aspect of the present invention is illustrated. For example, the regulated transaction can be related to allowing a particular vehicle into a restricted area (e.g., through a tunnel). At 1110, identification is received (e.g., utilizing a transponder and/or transmitter embedded in the vehicle and/or receiving the license plate number). For example, the identification can be a Vehicle Identification Number. At 1120, data store(s) (e.g., list(s) of stolen vehicles) are searched (e.g., by an identity transaction engine component). At 1130, a determination is made whether the vehicle identification is valid. If the determination at 1130 is NO, processing continues at 1160. If the determination at 1130 is YES, at 1140, a determination is made whether the vehicle has been reported stolen. If the determination at 1140 is YES, processing continues at 1170. If the determination at 1140 is NO, at 1150, the vehicle is permitted in the restricted area and no further processing occurs. At 1160, the vehicle is not permitted to drive in the restricted area and no further processing occurs. At 1170, the vehicle is not permitted in the restricted area and/or the authorities (e.g., Federal, State and/or local law enforcement agencies) are notified and no further processing occurs.

Figure 12:
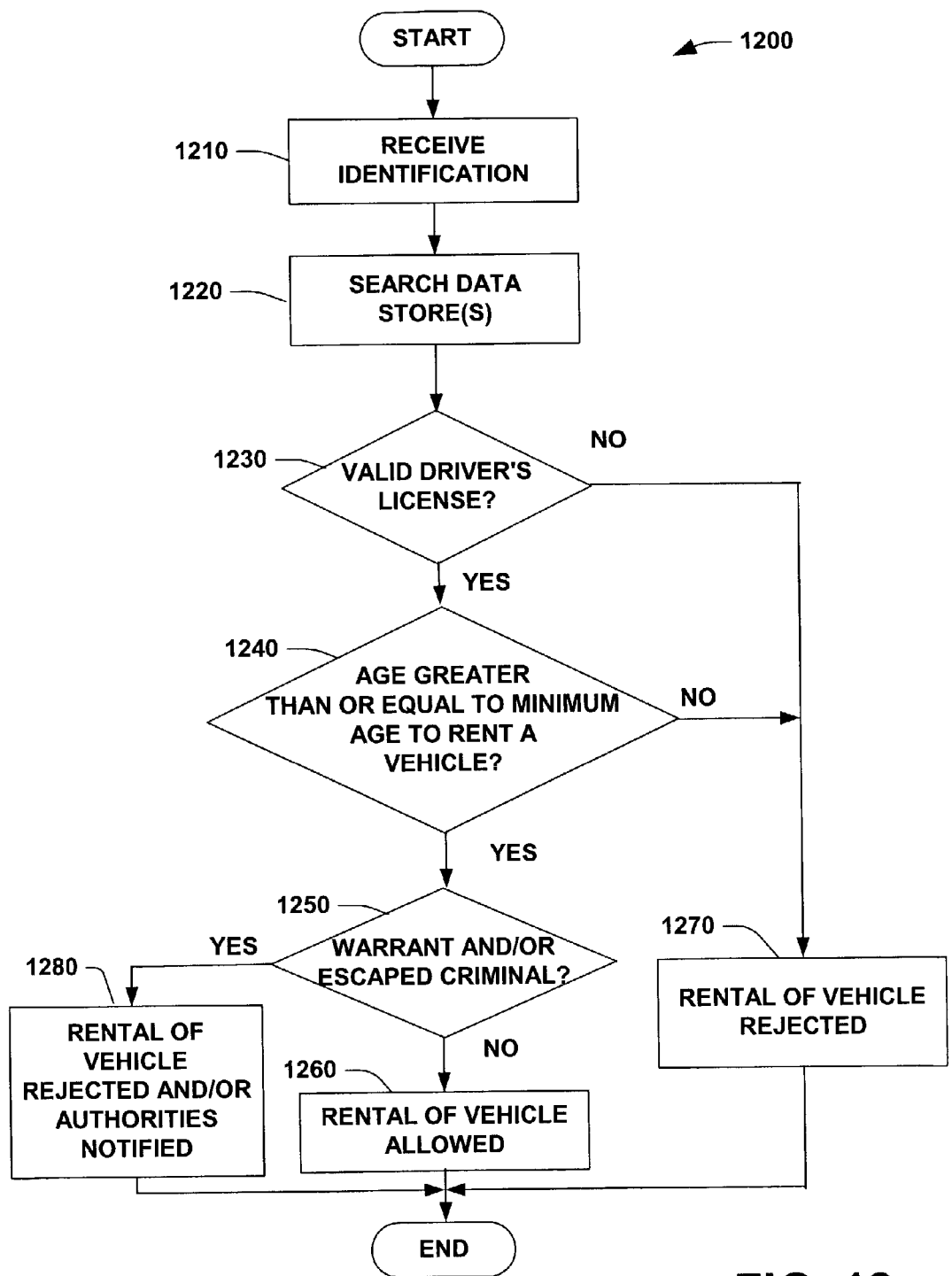
FIG. 12 is a flow chart illustrating a methodology for identification validation for a regulated transaction in accordance with an aspect of the present invention.

Next, turning to FIG. 12, a methodology 1200 for identification validation for a regulated transaction in accordance with an aspect of the present invention is illustrated. For example, the regulated transaction can be related to renting a vehicle. At 1210, identification (e.g., driver's license) is received (e.g., utilizing a magnetic card reader). For example, the identification can be a driver's license, state identification card, military identification card and/or passport. At 1220, data store(s) (e.g., drivers license records, list(s) of suspected terrorists, fleeing felons and/or fugitives from justice) are searched (e.g., by an identity transaction engine component). At 1230, a determination is made whether the identification (e.g., driver's license) is valid. If the determination at 1230 is NO, processing continues at 1270. If the determination at 1230 is YES, at 1240, a determination is made whether the person's age is greater than or equal to the minimum age to rent a vehicle. If the determination at 1240 is NO, processing continues at 1270. If the determination at 1240 is YES, at 1250, a determination is made whether the person has a warrant and/or is an escaped criminal (e.g., fleeing felon and/or fugitive from justice). If the determination at 1250 is YES, processing continues at 1280. If the determination at 1250 is NO, at 1260, the person is permitted to rent the vehicle and no further processing occurs. At 1270, rental of the vehicle is rejected and no further processing occurs. At 1280, rental of the vehicle is rejected and/or the authorities (e.g., Federal, State and/or local law enforcement agencies) are notified and no further processing occurs.

Figure 13:
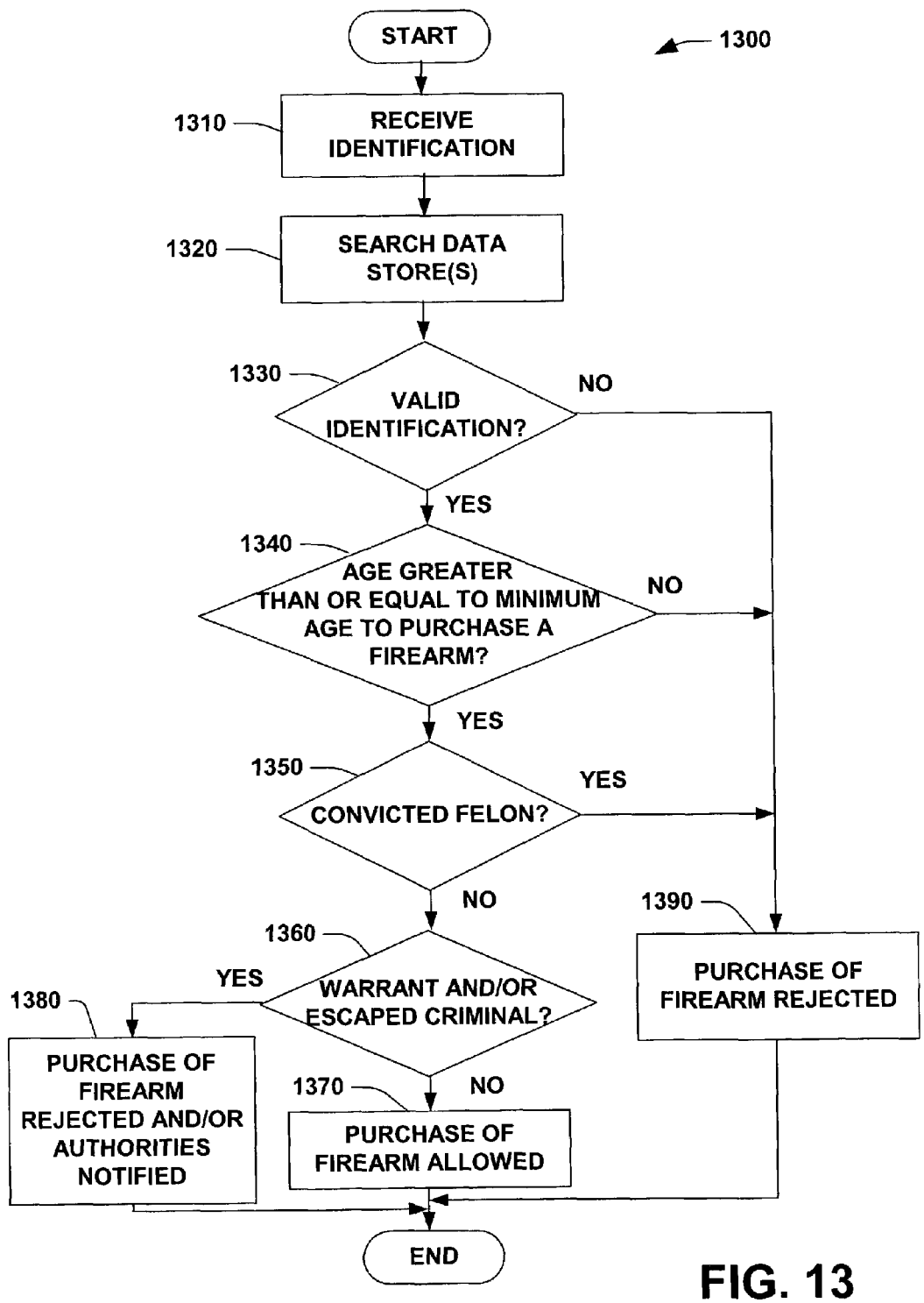
FIG. 13 is a flow chart illustrating a methodology for identification validation for a regulated transaction in accordance with an aspect of the present invention.

Referring next to FIG. 13, a methodology 1300 for identification validation for a regulated transaction in accordance with an aspect of the present invention is illustrated. For example, the regulated transaction can be related to purchasing a firearm. At 1310, identification (e.g., driver's license) is received (e.g., utilizing a magnetic card reader). For example, the identification can be a driver's license, state identification card, military identification card and/or passport. At 1320, data store(s) (e.g., drivers license records, list(s) of suspected terrorists, fleeing felons and/or fugitives from justice) are searched (e.g., by an identity transaction engine component). At 1330, a determination is made whether the identification is valid. If the determination at 1330 is NO, processing continues at 1390. If the determination at 1330 is YES, at 1340, a determination is made whether the person's age is greater than or equal to the minimum age to purchase a firearm. If the determination at 1340 is NO, processing continues at 1390. If the determination at 1340 is YES, at 1350, a determination is made whether the person is a convicted felon. If the determination at 1350 is YES, processing continues at 1390. If the determination at 1390 is NO, at 1360, a determination is made whether the person has a warrant and/or is an escaped criminal (e.g., fleeing felon and/or fugitive from justice). If the determination at 1360 is YES, processing continues at 1380. If the determination at 1360 is NO, at 1370, the person is permitted to purchase the firearm and no further processing occurs. At 1390, purchase of the firearm is rejected and no further processing occurs. At 1380, purchase of the firearm is rejected and/or the authorities (e.g., Federal, State and/or local law enforcement agencies) are notified and no further processing occurs.

Figure 14:
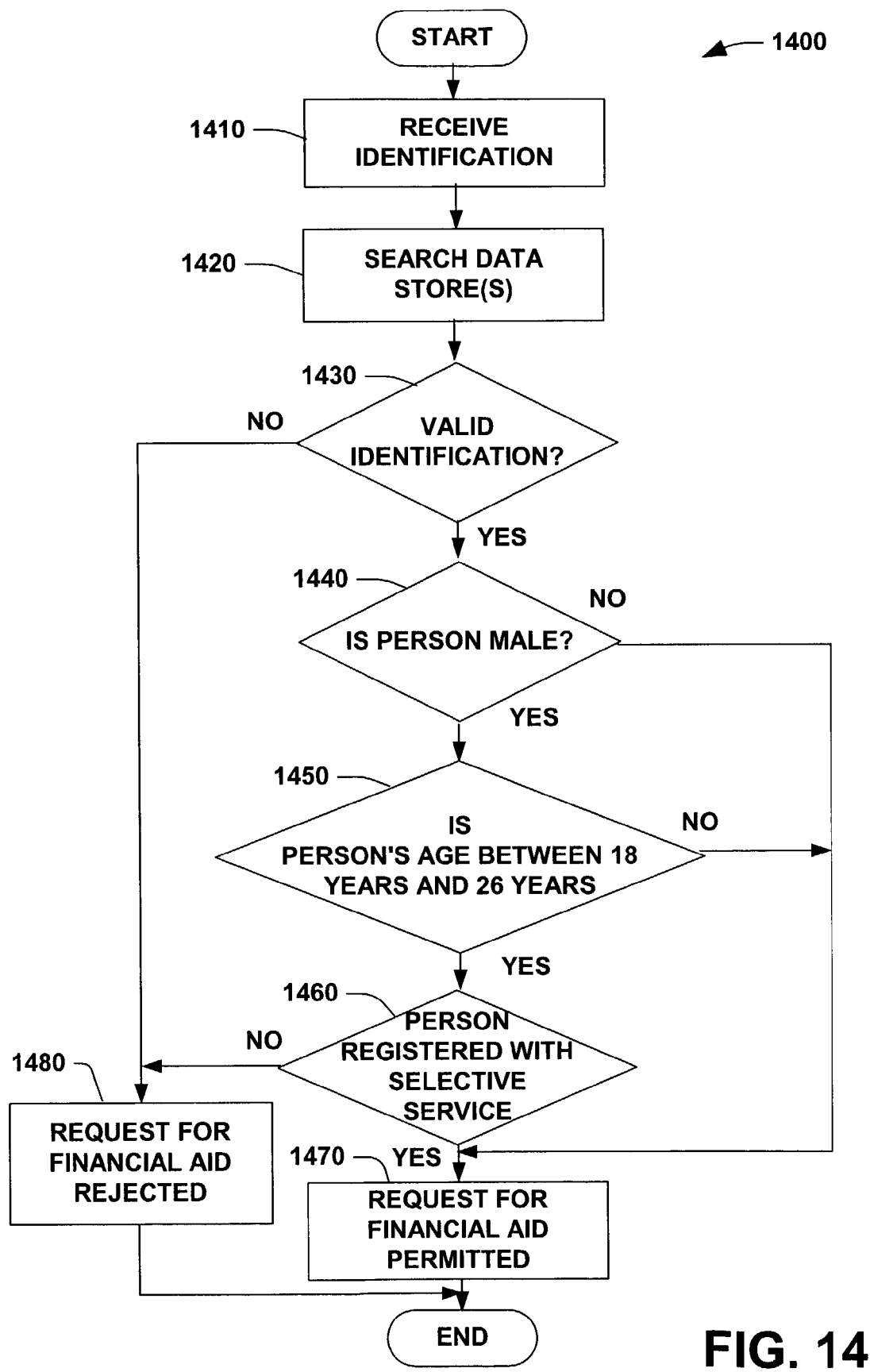
FIG. 14 is a flow chart illustrating a methodology for identification validation for a regulated transaction in accordance with an aspect of the present invention.

Turning to FIG. 14, a methodology 1400 for identification validation for a regulated transaction in accordance with an aspect of the present invention is illustrated. For example, the regulated transaction can be related to applying for financial aid for college tuition. At 1410, identification (e.g., driver's license) is received (e.g., utilizing a magnetic card reader). For example, the identification can be a driver's license, state identification card, military identification card and/or passport. At 1420, data store(s) (e.g., drivers license records and/or Selective Service records) are searched (e.g., by an identity transaction engine component). At 1430, a determination is made whether the identification is valid. If the determination at 1430 is NO, processing continues at 1480. If the determination at 1430 is YES, at 1440, a determination is made whether the person's gender is male. If the determination at 1440 is NO, processing continues at 1470. If the determination at 1440 is YES, at 1450, a determination is made whether the person's age is between eighteen years and twenty-six years. If the determination at 1450 is NO, processing continues at 1470. If the determination at 1450 is YES, at 1460 a determination is made whether the person has registered with the Selective Service. If the determination at 1460 is NO, processing continues at 1480. If the determination at 1460 is YES, at, the person is permitted to request (e.g., apply for) financial aid and no further processing occurs. At 1480, the person's request to apply for financial aid is rejected and no further processing occurs.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising."

What is claimed is:

1. A computer system for identification of an entity, comprising:
   an input component that receives identification information associated with an entity desiring or attempting to engage in a regulated transaction;
   an identity transaction engine component that, determines two or more data stores from a plurality of data stores comprising data stores of social service organizations, drivers' license agencies, state identification card issuing agencies, selective service systems, military, voter registration agencies, birth certificates issuing authorities, immigration services, security agencies, or non-governmental concerns to be searched based at least on one or more attributes of the regulated transaction, wherein the two or more data stores and determines whether to permit the entity to engage in the regulated transaction based at least in part upon analysis of the identification information received from the input component, and information stored in at least one of the one or more data stores; and
   an attribute data store that stores the one or more attributes of the regulated transaction, wherein the regulated transaction is at least one of voting, purchasing an alcohol product, purchasing a tobacco product, sending a letter, shipping a package, shipping a letter), purchasing a ticket for a mode of transportation, boarding a mode of transportation, transporting a hazardous material, entering a restricted area, entering a building, entering a facility, purchasing a fire arm, obtaining employment, retaining employment, requesting financial aid for education, engaging in a financial transaction, obtaining admission to an institution, obtaining permission to enter a country, entering a country, obtaining a license, obtaining an identification document, obtaining permission to vote or granting work authorization.

2. The computer system of claim 1, the input component further comprising an input device adapted to receive the identification information.

3. The computer system of claim 1, the identity transaction engine component utilizing at least one of a telephone connection, a network connection, an extranet, an intranet, the Internet, a satellite link, a wireless communication link, a serial communication link and a parallel communication link to facilitate searching of the at least one data store.

4. A regulated transaction authorization system, comprising:
   a communication component facilitating communication between an identity transaction engine component and at least one data store, the identity transaction engine component that identifies an entity, and determines whether to permit the entity to engage in a regulated transaction based at least in part upon at least one attribute of the regulated transaction, information associated with the entity and information stored in the at least one data store, the identity transaction engine searches at least two or more of data stores of social service organizations, drivers' license agencies, state identification card issuing agencies, selective service systems, military, voter registration agencies, birth certificates issuing authorities, immigration services, security agencies, or non-governmental concerns based on the at least one attribute related to the regulated transaction stored in at least one data store wherein the regulated transaction comprises a transaction restricted by one or more of a private or governmental concern is at least one of voting, purchasing an alcohol product, purchasing a tobacco product, sending a letter, shipping a package, shipping a letter), purchasing a ticket for a mode of transportation, boarding a mode of transportation, transporting a hazardous material, entering a restricted area, entering a building, entering a facility, purchasing a fire arm, obtaining employment, retaining employment, requesting financial aid for education, engaging in a financial transaction, obtaining admission to an institution, obtaining permission to enter a country, entering a country, obtaining a license, obtaining an identification document, obtaining permission to vote or granting work authorization;
   and
   an attribute data store that stores the at least one attribute of the regulated transaction.

5. The system of claim 4, further comprising an input device facilitating identification of the entity.

6. The system of claim 5, the input device being at least one of a card reader, a magnetic card reader, a keyboard, a touch screen device, an iris scanner, a retinal scanner, a thumb print reader, a digital camera, a pointing device, a microphone, an IR remote control, a joystick, a DNA fingerprint analyzer, a DNA profile analyzer, a game pad, a personal digital assistant, a smart card reader.

7. The system of claim 4, the output device facilitates communication to a user of the system.

8. The system of claim 7, the output device being at least one of a touch screen device, a computer monitor, a television screen, a printer, a personal digital assistant, a wireless telephone display and a speaker.

9. The system of claim 4, the at least one attribute being at least one of DNA profile, date of birth, age, ethnicity, citizenship, religious affiliation, political affiliation, health status, failure to have a particular disease, gender, Selective Service registration status, biometric data, height, weight, history of felony conviction, criminal history, inclusion on a list maintained by a governmental agency and inclusion on a list maintained by a private entity.

10. The system of claim 4, the at least one data store storing information related to at least one of Social Security records, drivers license records, motor vehicle records, state identification records, military identification records, voter registration records, birth records, passport records, selective service records, national identification records, and work authorization records.

11. The system of claim 4, the communications component utilizing at least one of a telephone connection, a network connection, an extranet, an intranet, the Internet, a satellite link, a wireless communication link, a serial communication link and a parallel communication link to communicate with the at least one data store.

12. The system of claim 4, the identity transaction engine component obtaining the at least one attribute of the regulated transaction from the attribute store.

13. A regulated transaction authorization system, comprising:
   means for communicating between a system for validating identity and at least one data store;
   means for identifying an entity desiring to engage in a regulated transaction restricted by one or more of government or private concerns wherein the regulated transaction is at least one of voting, purchasing an alcohol product, purchasing a tobacco product, sending a letter, shipping a package, shipping a letter), purchasing a ticket for a mode of transportation, boarding a mode of transportation, transporting a hazardous material, entering a restricted area, entering a building, entering a facility, purchasing a fire arm, obtaining employment, retaining employment, requesting financial aid for education, engaging in a financial transaction, obtaining admission to an institution, obtaining permission to enter a country, entering a country, obtaining a license, obtaining an identification document, obtaining permission to vote or granting work authorization;
   means for determining and searching at least two data stores from a plurality of data stores comprising data stores of social service organizations, drivers' license agencies, state identification card issuing agencies, selective service systems, military, voter registration agencies, birth certificates issuing authorities, immigration services, security agencies, or non-governmental concerns utilizing information from an attribute store;
   means for storing the information from the entity into at least one of the data stores;
   means for determining whether to permit the entity to engage in a regulated transaction based at least in part upon information obtained from the means for searching, the means for identifying and at least one attribute of the regulated transaction;
   means for performing a predefined additional regulatory action upon at least one of allowing and denying the entity to engage in the regulated transaction; and
   means for determining which of a plurality of data stores to search based at least in part upon the at least one attribute of the regulated transaction.

14. A method for identifying an entity and facilitating a regulated transaction, comprising:
   determining at least two data stores to search, based at least in part upon one or more attributes of a regulated transaction stored in an attribute store, wherein the at least two data stores are selected from data stores of social service organizations, drivers' license agencies, state identification card issuing agencies, selective service systems, military, voter registration agencies, birth certificates issuing authorities, immigration services, security agencies, or non-governmental concerns;
   searching the data stores based at least in part upon identification information received regarding the entity desiring to engage in a regulated transaction;
   saving the received identification information in at least one data store;
   determining whether the entity should be permitted to engage in the regulated transaction based at least in part upon the identification information, information obtained from the data stores and at least one attribute of the regulated transaction; and
   implementing an additional regulatory action upon at least one of denial and allowance of the regulated transaction which is restricted by one or more of government or private concerns wherein the regulated transaction is at least one of voting, purchasing an alcohol product, purchasing a tobacco product, sending a letter, shipping a package, shipping a letter), purchasing a ticket for a mode of transportation, boarding a mode of transportation, transporting a hazardous material, entering a restricted area, entering a building, entering a facility, purchasing a fire arm, obtaining employment, retaining employment, requesting financial aid for education, engaging in a financial transaction, obtaining admission to an institution, obtaining permission to enter a country, entering a country, obtaining a license, obtaining an identification document, obtaining permission to vote or granting work authorization.

15. The method of claim 14, further comprising at least one of the following acts:
   determining whether the identification information is valid;
   receiving the at least one attribute regarding the regulated transaction from the attribute store;
   allowing the regulated transaction if the determination of whether the entity should be permitted to engage in the regulated transaction is in the affirmative; and
   prohibiting the regulated transaction if the determination of whether the entity should be permitted to engage in the regulated transaction is in the negative.

16. A computer readable medium having computer usable instructions for identifying an entity and determining authorization of the entity to engage in a regulated transaction, comprising:

an identity transaction engine component that receives identification information associated with an entity desiring to engage in a regulated transaction and feeds the identification information directly into at least one data store, the identity transaction engine component selects at least two data stores to be searched from a plurality of data stores associated with social service organizations, drivers' license agencies, state identification card issuing agencies, selective service systems, military, voter registration agencies, birth certificates issuing authorities, immigration services, security agencies, or non-governmental concerns based at least upon at least one stored attribute of the regulated transaction and determine whether to permit the entity to engage in the regulated transaction based at least in part upon analysis of the identification information, information stored in the at least one data store and the at least one attribute of the regulated transaction; and an output device that facilitates a further predefined action based on at least one of authorizing and denying the entity to engage in the regulated transaction which is restricted by one or more of government or private concerns, the regulated transaction is at least one of voting, purchasing an alcohol product, purchasing a tobacco product, sending a letter, shipping a package, shipping a letter), purchasing a ticket for a mode of transportation, boarding a mode of transportation, transporting a hazardous material, entering a restricted area, entering a building, entering a facility, purchasing a fire arm, obtaining employment, retaining employment, requesting financial aid for education, engaging in a financial transaction, obtaining admission to an institution, obtaining permission to enter a country, entering a country, obtaining a license, obtaining an identification document, obtaining permission to vote or granting work authorization.

17. A computer system facilitating identification of an entity and authorization of a regulated transaction, comprising:

an identification input device that receives identification information associated with the entity desiring to engage in a regulated transaction and stores the identification information in at least one data store;

an identity transaction engine component that selects and searches at least two data stores selected from a plurality of data stores comprising at least data stores of social service organizations, drivers' license agencies, state identification card issuing agencies, selective service systems, military, voter registration agencies, birth certificates issuing authorities, immigration services, security agencies, or non-governmental concerns based at least upon one or more attributes associated with the regulated transaction and determines whether to permit the entity to engage in the regulated transaction based at least in part upon information associated with the regulated transaction, the identification information and information stored in at least one data store; and an output device that determines and performs a regulatory action in addition to and based on at least one of a permission or denial of the entity to engage in the regulated transaction that is restricted by one or more of a private or governmental concern and involves at least one of voting, purchasing an alcohol product, purchasing a tobacco product, sending a letter, shipping a package, shipping a letter), purchasing a ticket for a mode of transportation, boarding a mode of transportation, transporting a hazardous material, entering a restricted area, entering a building, entering a facility, purchasing a fire arm, obtaining employment, retaining employment, requesting financial aid for education, engaging in a financial transaction, obtaining admission to an institution, obtaining permission to enter a country, entering a country, obtaining a license, obtaining an identification document, obtaining permission to vote or granting work authorization.

* * * * *